United States Patent Office 3,452,016
Patented June 24, 1969

3,452,016
SUBSTITUTED TRIHALOPYRAZINES
Dorothy H. Horne, Oakland, Calif., assignor to The Dow Chemical Company, Midland, Mich., a corporation of Delaware
No Drawing. Filed Oct. 5, 1967, Ser. No. 672,971
Int. Cl. C07d 51/62, 51/66
U.S. Cl. 260—250                                5 Claims

ABSTRACT OF THE DISCLOSURE

New compounds of the formula

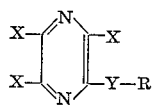

where each X is halogen, Y is oxygen or sulfur and R is alkyl, alkenyl, aralkyl, phenyl or substituted phenyl are variously useful as pesticides for the control of plant, insect and helminth organisms.

Background of the invention

The present invention is concerned with novel compositions of matter and is particularly directed to new substituted trihalopyrazines, useful as pesticides, for example, as herbicides, fungicides, insecticides or nematocides or the like. The new compounds are characterized by a hydrocarbyloxy, substituted hydrocarbyloxy, hydrocarbylthio or substituted hydrocarbylthio substituent attached to a carbon of the pyrazine ring.

Summary

In accordance with the invention, there are provided novel compounds having the formula

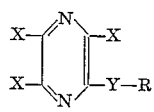

wherein each X is independently a halogen, Y is oxygen or sulfur and R is alkyl of from 1 to 12 carbon atoms, alkenyl of from 3 to 5 carbon atoms, benzyl, phenyl, loweralkylphenyl or halophenyl. The expression "halogen" as employed in the present specification and claims refers to fluorine, chlorine, bromine and iodine. The expression "loweralkyl" refers to alkyl groups containing from 1 to 4 carbon atoms and the expression "halophenyl" refers to phenyl radicals bearing one or two halogen substituents. The new compounds are oily liquids or crystalline solids, soluble in many organic solvents such as acetone, benzene and ethyl ether and relatively insoluble in water. These compounds have been found useful as pesticides for the control of undesirable plant, insect and helminth organisms.

The compounds of the invention may be prepared by reaction of a tetrahalopyrazine with an equimolar proportion of a compound of the formula M—Y—R wherein M is an alkali metal and Y and R are as described above. The reaction proceeds readily at temperatures of from about 10° C. to about 80° C. with the formation of alkali metal chloride as a byproduct. The contacting of the reactants is conveniently carried out in a solvent such as an alcohol and when Y is oxygen and R is alkyl or alkenyl it is preferred to carry out the reaction in the corresponding alcohol ROH. When Y is sulfur or when R is benzyl, phenyl or substituted phenyl, the reaction is conveniently carried out in a lower alkanol solvent.

The alkali metal compound, M—Y—R, employed as a reactant as described above, may be prepared by conventional procedures by reacting the free alkali metal with the compound of the formula H—Y—R. The reaction is conveniently carried out in a portion of the medium which is to serve as reaction solvent and the resulting solution of M—Y—R is then added to a solution or suspension of tetrahalopyrazine in a further portion of said solvent. Alternatively, when R is phenyl or substituted phenyl, the M—Y—R starting material can be prepared by reacting the H—Y—R phenolic compound with an equimolar proportion of alkali metal hydroxide and thereafter carrying out the reaction with the tetrahalopyrazine in an alkanol containing a small proportion of water.

In carrying out the reaction the tetrahalopyrazine and alkali metal compound, M—Y—R, are intimately contacted in the reaction solvent at a reaction temperature and in the proportions of at least one molar proportion of tetrahalopyrazine per molar proportion of the compound M—Y—R. An excess of the latter reactant will produce some of the desired product but such excess is generally to be avoided in order to suppress the formation of byproducts having two R—Y— moieties attached to the pyrazine ring. In most cases it is also desirable to carry out the reaction at relatively low temperatures, preferably at from about 15°–20° C., at least in its initial stages to minimize the formation of the undesired byproducts. The new compounds can be isolated from the reaction mixture by conventional procedures such as precipitation in water, washing and extraction. The crystalline products may be further purified by recrystallization.

The compounds of the invention may be employed directly for pesticidal purposes. Alternatively, the compounds may be intimately dispersed on or in a suitable pesticide carrier. Thus, for example, the trihalopyrazine compounds may be dispersed on finely divided solids such as diatomaceous earth, clay, pyrophyllite or the like to prepare dust compositions suitable for distribution on plants or in the soil. Similarly the active compound may be dissolved in one or a mixture of suitable solvents to prepare sprayable liquid compositions. Finely divided solid compositions and liquid compositions may be further formulated with surface-active dispersing agents to produce wettable-powder and emulsifiable liquid compositions, respectively. Any of the foregoing compositions can be distributed so as to contact pests with a pesticidal amount of one or more of the active compounds.

Description of preferred embodiments

The following examples illustrate the invention but are not to be construed as limiting the same.

EXAMPLE 1

Sodium metal (1 gram, 0.046 mole) was dissolved in 75 milliliters of methanol to prepare a methanolic solution of sodium methylate and the latter was added dropwise with stirring to a solution of 10 grams (0.046 mole) of tetrachloropyrazine in 125 milliliters of methanol. The addition of sodium methylate was carried out over a period of about 45 minutes and during this period the reaction mixture was maintained at a temperature of from about 15° to 20° C. Immediately thereafter the reaction mixture was allowed to warm to 25°–27° C. and maintained at such temperature with stirring for about 30 minutes. During the reaction sodium chloride precipitated from the reaction mixture and on completion of the reaction was separated by filtration. The filtrate was concentrated under vacuum and mixed with cold water to precipitate the 2,3,5-trichloro-6-methoxy-pyrazine product as a solid, melting at 33°–35° C.

EXAMPLE 2

Sodium metal (0.7 gram; 0.03 mole) was dissolved in about 125 milliliters of methanol to produce a methanolic solution of sodium methylate and the latter was added slowly with stirring to a solution of 6.5 grams (0.03 mole) of tetrachloropyrazine in 100 milliliters of methanol at room temperature. An exothermic reaction ensued and the temperature of the reaction mixture rose to about 29° C. Stirring was continued at room temperature for about 45 minutes after completion of the addition of the sodium methylate solution and thereafter the methanol was removed from the reaction mixture by evaporation under vacuum. The residue, consisting of a mixture of liquid and solid, was taken up in diethyl ether and the resulting slurry filtered to separate the solids. The filtrate was freed of ether by evaporation under vacuum to produce an oily product as a residue. Some dimethoxy-dichloro-pyrazine crystallized from the oily residue and was separated to obtain monomethoxy-trichloro-pyrazine as a light colored oil of 90–94% purity as determined by elemental analysis and nuclear magnetic resonance spectra.

EXAMPLE 3

1.44 grams (0.03 mole) of methanethiol and 0.69 gram (0.03 mole) of sodium metal were dissolved in about 200 milliliters of isopropyl alcohol and the resulting solution added slowly at room temperature to a solution of 6.5 grams (0.03 mole) of tetrachloro-pyrazine in about 100 milliliters of isopropyl alcohol. Rapid reaction ensued as evidenced by the formation of a precipitate. The addition of the reactants was accomplished over a period of about 85 minutes and thereafter the reaction mixture was stirred at room temperature for about two hours, and then poured onto ice to precipitate the 2,3,5-trichloro-6-(methylthio) pyrazine as a whole solid having a melting point of 43–44° C. Elemental analysis for carbon, hydrogen, nitrogen, sulfur and chlorine confirmed the composition of the product.

EXAMPLE 4

Following the general procedure of Example 2 0.7 gram of sodium metal was dissolved in about 150 milliliters of ethylene glycol and the resulting solution added to a slurry of 6.5 grams of tetrachloropyrazine in about 250 milliliters of ethylene glycol. The undissolved tetrachloro-pyrazine went into solution as the reaction proceeded. The reaction mixture was stirred overnight at room temperature and then concentrated by evaporation of ethylene glycol in a rotary evaporator under vacuum. The concentrated reaction mixture was poured onto ice and the resulting mixture extracted with diethyl ether. The ether solution was washed with water, dried and the ether removed by evaporation to obtain the 2,3,5-trichloro-6-($\beta$-hydroxyethoxy)pyrazine product as an oily liquid.

EXAMPLE 5

Following the general procedure of Example 1 further compounds of the invention were prepared as follows:

2,3,5-trichloro-6-isopropoxypyrazine was prepared by reaction of equimolar proportions of sodium isopropoxide and tetrachloro-pyrazine in isopropanol. The product was isolated as a yellow crystalline solid, fusible at below 50° C. to form a greenish oily liquid.

2,3,5-trichloro-6-ethoxy-pyrazine, prepared by reaction of equimolar proportions of tetrachloropyrazine and sodium ethoxide at about 25° C. in an excess of Formula 28A ethanol, was isolated as an oily solid melting below 50° C.

Dichloro-fluoro-methoxypyrazine was prepared as a yellow, waxy semi-solid by reaction of equimolar proportions of dichloro-difluoro-pyrazine and sodium methoxide in methanol solution.

EXAMPLE 6

10.1 grams (0.05 mole) of n-dodecyl mercaptan was dissolved in about 100 ml. of isopropyl alcohol and 1.2 grams (0.05 mole) of sodium metal added thereto to form a solution of sodium dodecyl-mercaptide. The resulting solution was added slowly with stirring during a period of 2.25 hours to a solution of 10.9 grams (0.05 mole) of tetrachloropyrazine in 450 ml. of isopropyl alcohol. During the addition a precipitate formed in the reaction mixture and heat was evolved. Stirring was continued at room temperature overnight and the reaction mixture was then poured on ice, forming an aqueous emulsion. The latter was extracted with diethyl ether and the ethereal solution separated, washed with water and dried over anhydrous sodium sulfate. The dried solution was treated with activated charcoal, filtered and the ether evaporated therefrom to obtain the 2,3,5-trichloro-6-(dodecylthio)-pyrazine product as a residue in the form of an amber oily liquid. This product was found by elemental analysis to contain 50.1 percent of carbon, 6.5 percent of hydrogen, 7.2 percent of nitrogen, 27.7 percent, of chlorine and 8.7 percent of sulfur, by weight, as compared to theoretical contents of 50.1, 6.5, 7.3, 27.8 and 8.3 percent, respectively, calculated for the respective elements in the named product.

EXAMPLES 7–9

Following the general procedure of Example 3, 0.075 mole of sodium and 0.075 mole of allyl mercaptan were reacted in isopropanol and the resulting solution added with stirring in a slurry of 0.075 mole of tetrachloropyrazine in isopropanol to produce 2,3,5-trichloro-6-(allylthio)-pyrazine. When the reaction mixture was poured on ice, the product precipitated as a tan powder and was separated by filtration. Elemental analysis confirmed the identity of the product.

In exactly similar fashion, sodium metal, p-chloro-thiophenol and tetrachloropyrazine were reacted in isopropyl alcohol and the product was recrystallized from hexane to obtain 2,3,5-trichloro-6-(p-chlorophenylthio)-pyrazine as a crystalline solid, melting at 114°–117° C.

In similar fashion, 2-(secondarybutylthio)-3,5,6-trichloropyrazine, prepared by reacting sodium secondary-butylmercaptide and tetrachloropyrazine in equimolar proportions in ethanol solution, was isolated as an oily liquid, soluble in ether, acetone and benzene and relatively insoluble in water.

EXAMPLE 10

4.7 grams (0.05 mole) of phenol, 10.8 grams (0.05 mole) of tetrachloropyrazine and 2 grams (0.05 mole) of sodium hydroxide were dispersed in a solution of 15 milliliters of water in 70 milliliters of isopropanol and the resulting mixture heated under reflux for about 70 minutes. Thereafter aqueous hydrochloric acid solution was added to the reaction mixture to neutralize any alkalinity and to precipitate the crude product. The latter was separated by filtration and recrystallized from hexane to obtain the 2,3,5-trichloro-6-phenoxy-pyrazine product as a white, crystalline solid, melting at 76°–77° C. This product was found by analysis to contain by weight 43.8 percent carbon, 38.8 percent chlorine and 10.0 percent nitrogen as compared to theoretical values of 43.7 percent, 38.8 percent and 10.15 percent, respectively, calculated for the respective elements in the named compound.

EXAMPLE 11

10 grams (0.047 mole) of the methoxy-trichloropyrazine of Example 1 was dissolved in 50 milliliters of carbon tetrachloride in a glass vessel and the solution irradiated with a sun lamp while chlorine was passed through the solution for a period of about 2.5 hours. The product, obtained as a residue by evaporation of the solvent, was an oily liquid consisting essentially of 2,3,5- trichloro-6-(trichloromethoxy)-pyrazine with a small amount of 2,3,5-trichloro-6-(dichloromethoxy)-pyrazine.

EXAMPLE 12

10 grams (0.017 mole) of tetraiodopyrazine was dispersed in about 100 milliliters of methanol and the resulting slurry cooled to a temperature of 0°–5° C. To this slurry a solution of sodium methylmercaptide was added dropwise with stirring over a period of 10 to 15 minutes. The sodium methylmercaptide solution had been prepared by dissolving 0.8 gram (0.017 mole) of methyl mercaptan and 0.4 gram (0.017 mole) of metallic sodium in about 50 milliliters of methanol. During the foregoing addition the temperature of the reaction mixture rose to 5°–10° C. On completion of said addition the reaction mixture was stirred for about 15 minutes and then poured over ice to precipitate the product. The latter was isolated by filtration to obtain the 2,3,5-triiodo-6-(methylthio)-pyrazine product as a solid, melting at 202°–204° C.

EXAMPLE 13

In a manner exactly similar to that of Example 12, except that tetrabromopyrazine was employed as starting material, there was obtained the 2,3,5-triboromo-6-(methylthio)-pyrazine product, a crystalline solid melting at 96°–98° C.

Following the methods of the foregoing examples the following are prepared:

2,3,5 - trichloro - 6 - (2,4 - dichlorophenylthio) - pyrazine, having a molecular weight of 360.5, by reaction of potassium 2,4-dichlorothiophenate with tetrachloropyrazine.

2,3,5-tribromo-6-benzyloxy-pyrazine, having a molecular weight of 423, by reaction of sodium benzyloxide with tetrabromopyrazine in excess benzyl alcohol.

2,3,5-trichloro-6-allyloxy-pyrazine, an oily liquid found to contain 35.2 percent carbon, 11.8 percent nitrogen and 44.2 percent chlorine by weight by elemental analysis.

2,3,5-trichloro-6-(2-butenyloxy)-pyrazine, having a molecular weight of 253.5, by reaction of sodium 2-butenoxide and tetrachloropyrazine.

The tetrachloropyrazine employed as a starting material in preparing compounds of the present invention can be prepared by direct chlorination of pyrazine by known methods. Tetrabromopyrazine may be prepared by the action of hydrogen bromide on a heated solution of tetrachloropyrazine in glacial acetic acid while tetraiodopyrazine and chloro-triiodopyrazine may be prepared by heating tetrachloropyrazine in boiling concentrated hydriodic acid under reflux. Other starting materials are prepared in similar fashion by corresponding halogen exchange reactions.

The compounds may be employed as pesticides by distributing the compound, usually in the form of a composition containing adjuvants to aid in dispersing same, so as to contact directly the organisms to be controlled or alternatively so as to contact the growth medium or habitat of the organisms whereby eventual contact with said organisms will be accomplished. For the control of the growth of higher plants in soil the lower alkoxy-trihalopyrazines and lower alkylthiotrihalopyrazines and particularly methoxy-trichloropyrazine and methylthio-trichloropyrazine are preferred. In such operations the active pyrazine compounds are distributed in soil in amounts of from about 0.1 to 50 pounds or more per acre so as to contact the seeds and emerging seedlings of the vegetation to be controlled. For control of lower plants, such as fungal organisms, the longer chain alkyl substituted compounds such as dodecylthio-trichloropyrazine may be applied to growth media of said organisms in amounts to provide about 100 parts or more by weight of the active compound per million parts of said medium.

In representative operations, compounds of the invention are dissolved in acetone along with a nonionic wetting and dispersing agent to produce a series of emulsifiable compositions containing 10 percent of one of the active pyrazine compounds. Said compositions are separately dispersed in water to prepare a series of aqueous dispersions containing 0.172 pound of one of the active pyrazine compounds per 100 gallons of aqueous composition. The resulting compositions are applied as soil drenches to separate areas of fertile soil previously fitted and planted with seed of pigweed, millet and crabgrass. The amount of aqueous composition is adjusted to apply one of said active compounds to each planted area at a dosage rate of 20 pounds per acre. Following the applications the treated areas and untreated check areas similarly fitted and seeded are maintained under good growing conditions for about two weeks. In such operations employing methoxy-trichloro-pyrazine, methylthio-trichloro-pyrazine and methoxyfluorodichloropyrazine as the active agents, it is found after said two-week period that none of the named plant species are growing in the treated areas while the untreated check areas support vigorous stands of said species.

In further operations on growing plants, aqueous dispersions containing 0.5 percent by weight/volume of methylthio-trichloropyrazine or of allylthiotrichloropyrazine were sprayed so as to wet thoroughly groups of young pigweed plants (2 to 4 inches tall.) Either composition gave complete control of the weeds.

I claim:

1. A trihalopyrazine compound of the formula

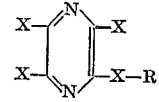

wherein each X is fluorine, chlorine, bromine or iodine, Y is oxygen or sulfur and R is alkyl of from 1 to 12 carbon atoms, alkenyl of from 3 to 5 carbon atoms, 2-hydroxyethyl, benzyl, phenyl, loweralkylphenyl or halophenyl.

2. The compound of claim 1 wherein R is methyl, Y is oxygen and X is chlorine, corresponding to 2,3,5-trichloro-6-methoxy-pyrazine.

3. The compound of claim 1 wherein R is methyl, Y is sulfur and X is chlorine, corresponding to 2,3,5-trichloro-6-methylthio-pyrazine.

4. The compound of claim 1 wherein R is allyl, Y is sulfur and X is chlorine, corresponding to 2,3,5-trichloro-6-allylthio-pyrazine.

5. The compound of claim 1 wherein R is phenyl, Y is oxygen and X is chlorine, corresponding to 2,3,5-trichloro-6-phenoxy-pyrazine.

References Cited

UNITED STATES PATENTS 3,169,848  2/1965  Gysin et al. _____ 260—250

NICHOLAS S. RIZZO, *Primary Examiner.*

U.S. Cl. X.R.

424—250

PO-1050
(5/69)

UNITED STATES PATENT OFFICE
CERTIFICATE OF CORRECTION

Patent No. 3,452,016         Dated June 24, 1969

Inventor(s) Dorothy H. Horne

It is certified that error appears in the above-identified patent and that said Letters Patent are hereby corrected as shown below:

Column 3, line 37, for "whole" read -- white --; Column 6, lines 38 to 42, the formula should appear as shown below instead of as in the patent:

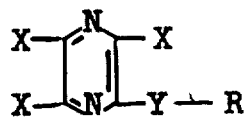

SIGNED AND
SEALED

OCT 7 - 1969

(SEAL)
Attest:

Edward M. Fletcher, Jr.
Attesting Officer

WILLIAM E. SCHUYLER, JR.
Commissioner of Patents